United States Patent
Alexandre et al.

(10) Patent No.: US 7,082,167 B2
(45) Date of Patent: Jul. 25, 2006

(54) METHOD AND DEVICE FOR CONTROLLING THE QUALITY OF VIDEO DATA

(75) Inventors: Patrice Alexandre, Cesson Sévigné (FR); Xavier Ducloux, Rennes (FR); Gildas Guelou, Cesson Sévigné (FR)

(73) Assignee: Nextream S.A., Cergy Pontoise (FR)

( * ) Notice: Subject to any disclaimer, the term of this patent is extended or adjusted under 35 U.S.C. 154(b) by 463 days.

(21) Appl. No.: 10/096,707

(22) Filed: Mar. 13, 2002

(65) Prior Publication Data

US 2002/0181584 A1 Dec. 5, 2002

(30) Foreign Application Priority Data

Mar. 29, 2001 (FR) .................................. 01 04623

(51) Int. Cl.
*H04N 7/12* (2006.01)
(52) U.S. Cl. .............................. 375/240.26; 375/240.29
(58) Field of Classification Search ........... 375/240.26, 375/240.29, 240.02–240.07
See application file for complete search history.

(56) References Cited

U.S. PATENT DOCUMENTS

| | | | | |
|---|---|---|---|---|
| 5,115,309 | A * | 5/1992 | Hang ...................... | 348/388.1 |
| 5,801,779 | A * | 9/1998 | Uz et al. ................ | 375/240.24 |
| 6,038,256 | A | 3/2000 | Linzer et al. ............ | 375/240 |
| 6,111,991 | A | 8/2000 | Ribas-Corbera et al. .... | 382/251 |
| 6,192,083 | B1 * | 2/2001 | Linzer et al. .......... | 375/240.29 |
| 6,567,117 | B1 * | 5/2003 | Nago et al. ................ | 348/180 |
| 6,738,423 | B1 * | 5/2004 | Lainema et al. ........ | 375/240.03 |
| 2003/0133510 | A1 * | 7/2003 | Nishikawa et al. .... | 375/240.26 |

FOREIGN PATENT DOCUMENTS

| | | |
|---|---|---|
| EP | 0778708 A2 | 6/1997 |
| EP | 0827346 A2 | 3/1998 |
| EP | 0982951 A1 | 3/2000 |
| EP | 1005233 A1 | 5/2000 |
| WO | WO 00/16559 | 3/2000 |

OTHER PUBLICATIONS

Wang et al, "Joint rate control for multi-program video coding", IEEE Transactions on Consumer Electronics, vol. 42, No. 3, pp. 300-305, Aug. 1996.*

* cited by examiner

*Primary Examiner*—Vu Le
(74) *Attorney, Agent, or Firm*—Joseph J. Laks; Ronald H. Kurdyla; Guy H. Eriksen

(57) ABSTRACT

The present invention relates to a method and a device for monitoring the quality of video data having to undergo coding and decoding, making it possible to maintain predetermined constant quality of the video data after decoding. The method is such that information representing the complexity of video data to be coded is received from at least one coder. For each video-data item to be coded, a reference quantization value is calculated as a function of the complexity. For each video-data item to be coded, a reference throughput calculated as a function of the reference quantization value and of the value of the predetermined constant quality is calculated and transmitted to the coder, allowing the coder to code each video data item so as to obtain video data at the predetermined quality, after decoding.

9 Claims, 4 Drawing Sheets

METHOD AND DEVICE FOR CONTROLLING THE QUALITY OF VIDEO DATA

The invention relates to a method and a device for monitoring the quality of video data having to undergo coding and decoding, making it possible to maintain predetermined constant quality of the video data after decoding.

BACKGROUND OF THE INVENTION

Video compression according to certain standards, and especially according to the MPEG2 standard, is known as a method of "non-transparent" coding which, in particular, makes it possible to represent a video-data sequence in the form of a stream of binary elements the throughput of which is adjustable to the conditions of storage and/or of transport of the stream. The terminology "non-transparent" means that the coding algorithms used adapt the level of degradation applied to the data sequence as a function of the entropy level of the video signal and of the desired throughput for the resulting stream. The degradations applied are the result of a process of quantization of coefficients representative of the video signal after DCT (Discrete Cosine Transform) transformation.

For a binary stream of constant throughput, the method of coding according to the MPEG2 standard permanently adjusts the quantization level of the DCT coefficients in such a way that their coding generates a binary stream in accordance with the target bitrate. Such an approach tends to make the level of degradation variable, for a video signal the entropy of which varies over time. Hence, fixed-throughput coding generates a variable level of coding quality.

When several video sequences are transported jointly on a transmission channel with fixed bandwidth (as in the case of a satellite transponder, for example), it is preferable to share the usable throughput between the coding methods via a centralized throughput-allocation algorithm. This solution, widely presented under the title of statistical multiplexing, makes it possible to reduce the overall degradation perceived by 10 to 30% on average by comparison with sharing in a mode with fixed throughput for each video sequence.

More particularly, the statistical multiplexing applies a reduction in the dispersion of coding quality between the video sequences, by distributing more throughput to the video sequences exhibiting the greatest entropy.

Nevertheless, statistical multiplexing is based on the statistical properties of the content of video sequences in finite numbers, such that the coding quality perceived in the course of time still exhibits fluctuations. For example, when all the video sequences simultaneously exhibit very high entropy, the overall quality of the coding becomes less than the average service quality. Conversely, when video sequences of low entropy are transmitted at the same instant, the overall quality of the coding then becomes higher than the average coding quality.

In this latter case, it becomes advantageous to reduce the total throughput allocated to the coding of the video sequences in favour of the data of an opportunistic nature (data the throughput of which is not guaranteed). The coding of each video sequence then takes place by limiting its throughput to that making it possible to obtain the quality of service envisaged.

The international patent application WO 00/16559, on this subject, explains that it is pointless producing data the visual quality of which would be higher than a predetermined quality. This application mentions a linear correspondence between a predetermined quality level and a quantization parameter, this correspondence not involving the complexity of the image and thus not making it possible to guarantee a constant quality for the coded data.

Moreover, this application mentions the transmission of opportunistic data when the sum of the throughputs of the streams sharing the channel is less than the bandwidth of the channel.

However, in order to obtain an effective method of sharing bandwidth while guaranteeing a level of quality for all the video sequences, it is important to take into account the content of the video sequences. This is because the quantity of information necessary to code a video sequence depends on the entropy of these sequences. The higher the entropy, the greater the quantity of information necessary to code it in order to guarantee a constant quality, and, conversely, the lower the entropy, the lower the quantity of information.

The invention thus proposes to guarantee a constant quality of the video data after decoding, taking into account the spatial and/or time-domain complexity of the data in order to determine the quantization interval.

BRIEF SUMMARY OF THE INVENTION

To that end, the present invention proposes a method of monitoring the quality of video data having to undergo coding and decoding, making it possible to maintain predetermined constant quality of the video data after decoding. According to the invention Information representing the complexity of video data to be coded is received from at least one coder, For each video-data item to be coded, a reference quantization value is calculated as a function of the complexity, For each video-data item to be coded, a reference throughput calculated as a function of the reference quantization value and of the value of the predetermined constant quality is calculated and transmitted to the coder, allowing the coder to code each video-data item so as to obtain video data at the predetermined quality, after decoding.

One of the particular features of the invention is the definition of a parametric quality model via which the user is in a position to define the desired quality of service, the parametric model proposed taking into account criteria for appreciating the quality subjectively perceived after coding.

This is because the methods of coding by quantization of the DCT coefficients exhibit the difficulty of not giving a constant subjective perception of quality for a given level of quantization. More precisely, the data sequences featuring low richness of content (e.g.: large plane on a face), for equivalent subjective quality rendition, require a lower level of quantization than for sequences the content of which features high richness (e.g., crowd of a football stadium).

The benefit of the invention is that of taking into consideration the above-mentioned characteristics in a parametric quality model in which the level of spatial-temporal complexity of the video sequence to be coded plays a part as an element for adjusting the average quantization level envisaged.

Preferably, the complexity of the video data is measured by carrying out, on the one hand, an analysis of coding costs which are obtained by a discrete-cosine transform, quantization and coding of variable-length type and, on the other hand, an analysis of cost of the syntax necessary for the generation of the coded video data.

According to one particular mode, the video data possibly being in spatial mode, data known as intra-type data or data in time-domain mode, video data known as inter-type data possibly being either bi-directional or predicted, the analysis of the coding cost consists, in the case of the video data of intra and inter type, in carrying out a spatial analysis of the content followed, in the case of the inter-type images, by a time-domain analysis.

The invention applies particularly to coders of MPEG2 type.

In one particular embodiment, when the video data are transmitted after coding on a transmission channel the bandwidth of which is fixed, the throughput applied at the output of the coder is the minimum value between the reference throughput calculated and the throughput of the transmission channel.

In one particular embodiment, when information representing the complexity of video data to be coded is received from at least two coders, the data output by the various coders being intended to be transmitted on the same transmission channel, a target bitrate (Di) is calculated for each coder, representing a fraction of the bandwidth of the channel, the sum of the throughputs Di being equal to the bandwidth of the channel, and when the sum of the reference throughputs is greater than the bandwidth of the channel, the bandwidth is shared between the various coders by allocating them their target bitrates (Di), less than their reference throughput ($D_{ref}$), when the sum of the reference throughputs is less than or equal to the bandwidth of the channel, its reference throughput ($D_{ref}$) is allocated to each coder.

Thus, in contrast to the known systems, when a coder reaches its maximum quality throughput, it does not release throughput by generating free empty packets in order to insert opportunistic data, but the bandwidth is shared equitably between the various coders requiring more throughput.

Advantageously, when the reference throughput is less than the throughput of the transmission channel, data known as opportunistic data are inserted into the transmission channel, the throughput of these opportunistic data being at most equal to the throughput of the transmission channel minus the reference throughput.

Thus, when all the coders have sufficient throughput, then it is possible to insert data among the video data.

Correspondingly, the invention relates to a device for monitoring the quality of video data having to undergo coding and decoding making it possible to maintain predetermined constant quality of the data after decoding. According to the invention, the device includes:

Means for receiving, from at least one coder, information representing the complexity of data to be coded, Means for calculating a reference quantization value, for each data item to be coded, as a function of the complexity, Means for calculating, and transmitting to the coder, for each data item to be coded, a reference throughput calculated as a function of the reference quantization value and of the value of the predetermined constant quality, allowing the coder to code each data item so as to obtain data at the predetermined quality after decoding.

The invention also relates to a system for coding video data including at least one video coder, a device for monitoring the quality of video data according to claim 8, a multiplexer, and a means for inserting data, known as opportunistic data, in order to transmit the coded video data and the opportunistic data on the same transmission channel.

BRIEF DESCRIPTION OF THE DRAWINGS

The invention will be better understood, and other features and advantages will emerge on reading the description of the embodiment examples which will follow, given by way of non-limiting examples, by reference to the attached drawings, among which.

DETAILED DESCRIPTION OF THE INVENTION

The description is given by reference to a coder according to the MPEG2 standard, and constitutes a preferred embodiment given by way of illustration and not restriction.

Figure 1:
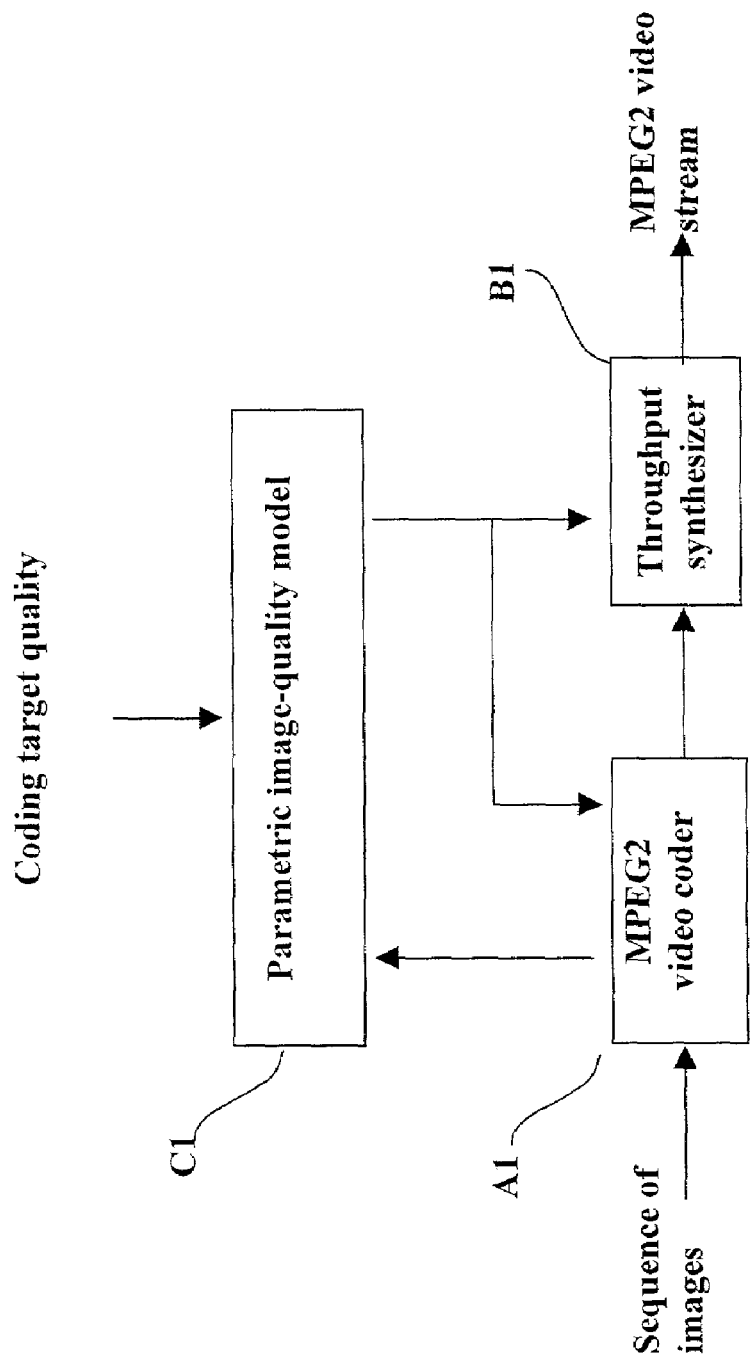
FIG. 1 represents a block diagram of a fixed-quality and variable-throughput coder according to the invention.

FIG. 1 represents an architecture for coding at fixed quality and variable throughput according to the invention. It includes a video coder of MPEG2 type, A1, linked to a throughput synthesizer B1 as well as to a module C1 allowing the application of a parametric quality model according to the invention.

This module C1 equalizes the continuous allocation of the throughput from generation of the MPEG2 video stream on the basis of the spatial-temporal information fed back by the coder A1 and of the target quality programmed by the user. Hence, at each new image coded by the coding module A1, the spatial-temporal information is updated and forwarded to the module C1. The latter then calculates the new value of the throughput which will make it possible to maintain the datum quality level.

The evaluation of the coding quality involves psycho-subjective criteria which make it intricate to implement. At the level of the coding, the quality can be expressed by the average value of the quantization level used for the coding of each image. The closer that approaches to the unity value, the better the quality reproduced after decoding.

A first solution therefore consists in associating a fixed quantization value to a quality scale, linear or otherwise. This approach offers the advantage of being simple to implement, but exhibits two major defects:

1- It is recognized that the perception of the artefacts relating to quantization is naturally masked by the content of the coding of the video signal itself. Hence, for the same quantization level, an image exhibiting high spatial activity (content rich in details) has the effect of masking the quantization effects, where an image with meagre content (few details) reveals readily perceptible artefacts (for example, the block effects).

2- It is recognized that the perception of artefacts is all the more sensitive if the content of the images is stable from one image to another. Hence, an image the content of which is made up of objects in rapid movement is perceived as being of better quality than an image with the same static content for the same level of quantization.

Figure 2:
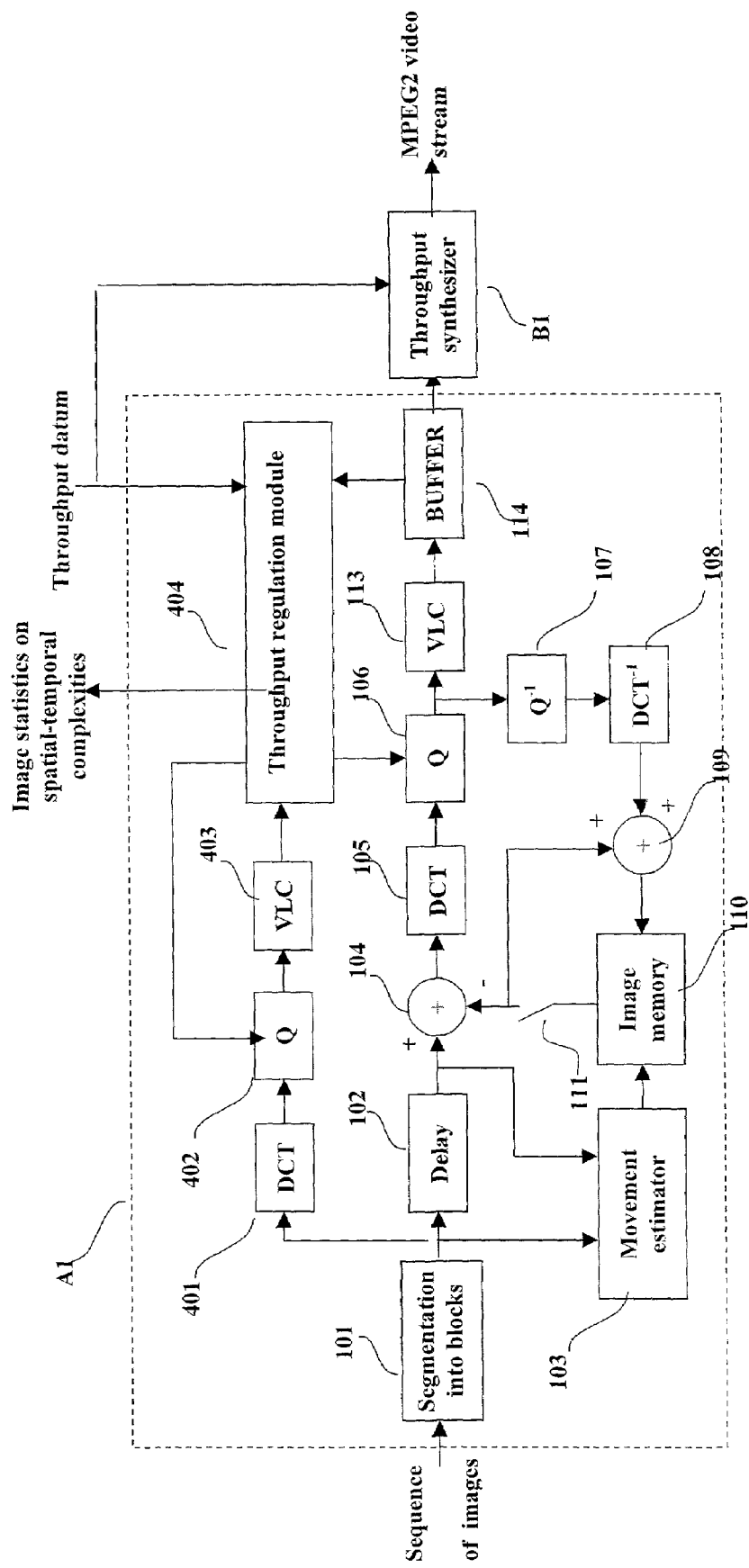
FIG. 2 represents the elements of a fixed-quality and variable-throughput coder according to the invention.

More precisely, FIG. 2 presents the discriminating elements of an MPEG2 video coder A1 making it possible to arrive at the constant-quality coding method according to the invention.

The video data, in a non-limiting way, are described as being video images throughout the description. The video images are segmented into elementary 16×8 pixel blocks 101 and forwarded simultaneously to a movement-estimation module 103 and to a delay module 102. The output of the delay module 102 is forwarded to a differentiator module 104 as well as to a movement-estimation module 103 which takes the measurement of the movement of the elementary blocks between the images situated upstream and downstream of the delay module 102.

The movement-estimation module 103 supplies, at its output, a field of movement vectors making it possible to produce a prediction of the image to be coded at the input of the differentiator 104 on the basis of the image previously coded and stored in the image memory 110. The content of the memory 110 therefore represents the previously coded image as it is rendered by the method of decoding of the MPEG2 video stream.

In the case of a coding in spatial mode (intra image), a router 111 is open in such a way that the elementary blocks of the image to be coded are sent as such to a DCT module 105. The coefficients output by the module 105 are then quantized by a quantization module 106, before being formatted into variable-length code (VLC) by the module 113. The resulting binary train is stored in a buffer memory 114, the role of which is to spool out the sending of the binary stream at the rate of the throughput imposed by a throughput synthesizer 11.

The output of the quantization module 106 is also routed to an inverse-quantization module 107 followed by an inverse DCT module 108. These two stages carry out the function of reconstruction of the elementary blocks as it is implemented by an MPEG2 video-stream decoder, so as to keep, in an image memory 110, the reference image used during the reconstruction by the decoder.

When the image presented at the output of a delay module 102 is coded in differential mode (predicted image), the router 111 is closed, which has the effect of activating the measurement of difference by the differentiator module 104 between the image to be coded and the predicted image, by movement compensation on the image stored in the image memory 110.

The coding path at the output of the differentiator 104 is then the same as for the intra-image case. On the other hand, the new image stored in the image memory 110 is then obtained by summing of the elementary blocks between the output of this image-memory module 110 and the prediction error output by an inverse-DCT module 108. The summing is carried out by a differentiator module 109 which gives back the image memory 110.

It will be noted that the MPEG2 standard allows a differential representation of the images of a sequence by the use of movement compensation. In a stream of images coded according to the MPEG2 standard, some of them are represented in the spatial mode by simple DCT transformation followed by quantization. By movement compensation, images coded by way of difference by comparison with one or more reference images are also found.

In the first case, the reference image is situated at an instant in time which is earlier in the image sequence, and predicted images are then spoken of (giving rise to the term "P image"). In the second case (not described by FIG. 1), the two reference images frame, in terms of time, the image to be coded in the sequence by way of a bi-directional movement compensation (giving rise to the term "B image").

The P and B type coded images are therefore presented in the form of a difference in video images one of which is movement-compensated, which makes it possible to reduce considerably the time-domain redundancy contained in a sequence of video images. By way of example, a video sequence composed of a fixed image could advantageously be coded by invoking type P and B images. This is because it is sufficient to code the first image of the video sequence in spatial mode (I image) and to code the other images according to the P and/or B type, in such a way that these differential images present an empty content (the difference from the reference image being zero in the case of a fixed image).

The principle of movement compensation and differential coding constitutes a strong point of the coding according to the MPEG2 standard. On the other hand, this type of coding gives rise to strong variations in quality when the binary stream resulting from the coding has to satisfy the condition of constant throughput over time. It can be understood, intuitively, that a sequence of images exhibiting slight variations in content in the course of time gives rise to predicted images of low entropy and therefore of small size after coding. Hence, for the same coding throughput, the quantization level used for the sequence is less than what it would have been for the coding of a sequence the content of which varies strongly from image to image.

DCT 401, quantization 402 and VLC-formatting 403 modules are therefore added in parallel with the delay module 102. These three modules make it possible to carry out pre-coding of each video image in the spatial mode (intra image), and the result of coding is forwarded to the throughput-regulation module 404. This regulation module drives the quantization level of the module 402 in such a way as to establish a measurement of spatial complexity of each image in the form:

$$X_I = \sum_{i=1}^{N_{eb}} Q_I^{eb}(i) \cdot Ccoef_I^{eb}(i) \tag{2}$$

$Q_I^{eb}(i)$ being the value of the quantization level used by the quantization module 402 for the elementary block i.

$Ccoef_I^{eb}(i)$ being the cost of coding of the DCT coefficients of the elementary block i (number of bits generated by the VLC formatting 403).

$N_{eb}$ being the number of elementary blocks in each image.

The value of the quantization level applied to the module 402 may, for example, be determined as a function of the level of throughput received by the throughput-regulation module 404. Preferably, its drive is provided by the parametric image-quality model C1 described in FIG. 1.

Jointly with the measurement (2), the regulation module 404 records the syntax cost of the information output by the VLC module 403 which are not relative to the DCT coefficients (image headers, modes for representing elementary blocks, etc):

$Csyn_I$ is the cost (number of bits generated by the VLC formatting 403) of the syntax elements of the MPEG2 stream relative to the image coded in spatial mode.

The total cost for the coding of the image in spatial mode (size of the MPEG2 stream relating to the image) is then expressed as:

$$C_I = Csyn_I + \sum_{i=1}^{N_{eb}} Ccoef_I^{eb}(i) \quad (3)$$

When the image to be coded at the input of the differentiator 104 is not in spatial mode (the case of a predicted image, for example), the throughput-regulation module 404 has a second measurement of complexity (called time-domain measurement) in the form:

$$X_P = \sum_{i=1}^{N_{eb}} Q_P^{eb}(i) \cdot Ccoef_P^{eb}(i) \quad (4)$$

$Q_P^{eb}(i)$ being the value of the quantization level used by the module 106 for the elementary block i.

$Ccoef_P^{eb}(i)$ being the cost of coding of the DCT coefficients of the elementary block i (number of bits generated by the VLC formatting 113).

$N_{eb}$ being the number of elementary blocks in each image.
With, in the same way as before:

$$C_P = Csyn_P + \sum_{i=1}^{N_{eb}} Ccoef_P^{eb}(i) \quad (5)$$

Finally, it will be noted that:

$$X_B = \sum_{i=1}^{N_{eb}} Q_B^{eb}(i) \cdot Ccoef_B^{eb}(i) \quad (6)$$

$$C_B = Csyn_B + \sum_{i=1}^{N_{eb}} Ccoef_B^{eb}(i) \quad (7)$$

in the latter case of an image coded in bi-directional mode (case not represented explicitly in FIG. 2).

With each coded image, the throughput-regulation module 404 therefore has available two sets of statistics on complexities and syntax costs which it forwards to the parametric image-quality module 31: $(X_I, Csyn_I)$ and $(X_T, Csyn_T)$, the index T taking the value I, P or B depending on the type of coding of the current image.

The parametric image-quality module C1 then carries out the calculation of the throughput to be applied to the coder A1 as a function of the statistics which it receives. To do that, it proceeds in two stages:

1- Calculation of the quantization level known as "reference" quantization level which represents the quantization level to be applied to the images coded in spatial mode (I images) as a function of the target quality value programmed by the user:

$$Q_{ref} = \left(K \cdot \left[\alpha \frac{X_I}{N_{eb}} + (1-\alpha) \frac{X_P}{N_{eb}}\right]\right)^\gamma \quad (8)$$

with:
K=0.1
α=0.5
0.3<γ<0.55

2- Calculation of the throughput to be applied in order to satisfy this reference-quantization level upon coding:

$$D_{ref} = \frac{F_{image}\left[Csyn_I + N_P Csyn_P + N_B Csyn_B + \frac{X_I + N_P K_P X_P + N_B K_B X_B}{Q_{ref}}\right]}{1 + N_P + N_B} \quad (9)$$

with:
$F_{image}$, number of images to be coded per second.
$N_P$, number of P images between 2 images of type I in the stream.
$N_B$, number of B images between 2 images of type I in the stream.
$K_P$=1.1
$K_B$=0.65

The values $K_P$ and $K_B$ are used by the coder in order to determine the rules for proportioning of the average quantization levels between types of coded images:

$$Q_I = K_P Q_P = K_B Q_B \quad (10)$$

where $Q_I$, $Q_P$ and $Q_B$ are the average quantization levels for the images of respective types I, P and B.

The target quality value selected by the user at the input of the parametric quality module has an influence on the value γ in formula (7). For our quality criterion expressed over a scale from 0 (minimum quality) to 100 (maximum quality), the relationship is then expressed in the form:

$$\gamma = 0.55 - 0.25 \times \frac{\text{quality\_criterion}}{100} \quad (11)$$

The parametric image-quality module C1 then sends the value $D_{ref}$ as throughput datum value, to the coder A1 and to the throughput synthesizer C1. It preferably also forwards the value $Q_{ref}$ to the coder A1 so that the coder can apply it to the quantization module 402 as described in FIG. 2.

It should be noted that the values of complexities forwarded by the throughput-regulation module 404 are updated upon each new coded image, and that their content changes in certain cases only as a function of the type of coding adopted for the image (I, P or B). A mechanism for memory-storage of the most recent values $X_I$, $X_P$ and $X_B$ is used by the parametric image-quality module C1 in order to allow the application of formulae (8) and (9) to each new image to be coded.

It should also be noted that the method described above applies advantageously to the case in which the coder A1 makes use of a two-pass coding mechanism. In this latter case, the spatial-temporal complexity information is obtained via the first coding pass in anticipation of the coding of the second pass. More precisely, the value of the reference throughput $D_{ref}$ output by the parametric image-quality module C1 is then obtained on the basis of spatial-temporal complexities really associated with the images to be coded. In the case of coding with a single pass, these spatial-temporal complexities arise from images already coded, which renders the value of the throughput $D_{ref}$ locally inappropriate when the images to be coded undergo a substantial change in content (the case of a change of scene, for example).

Figure 3:
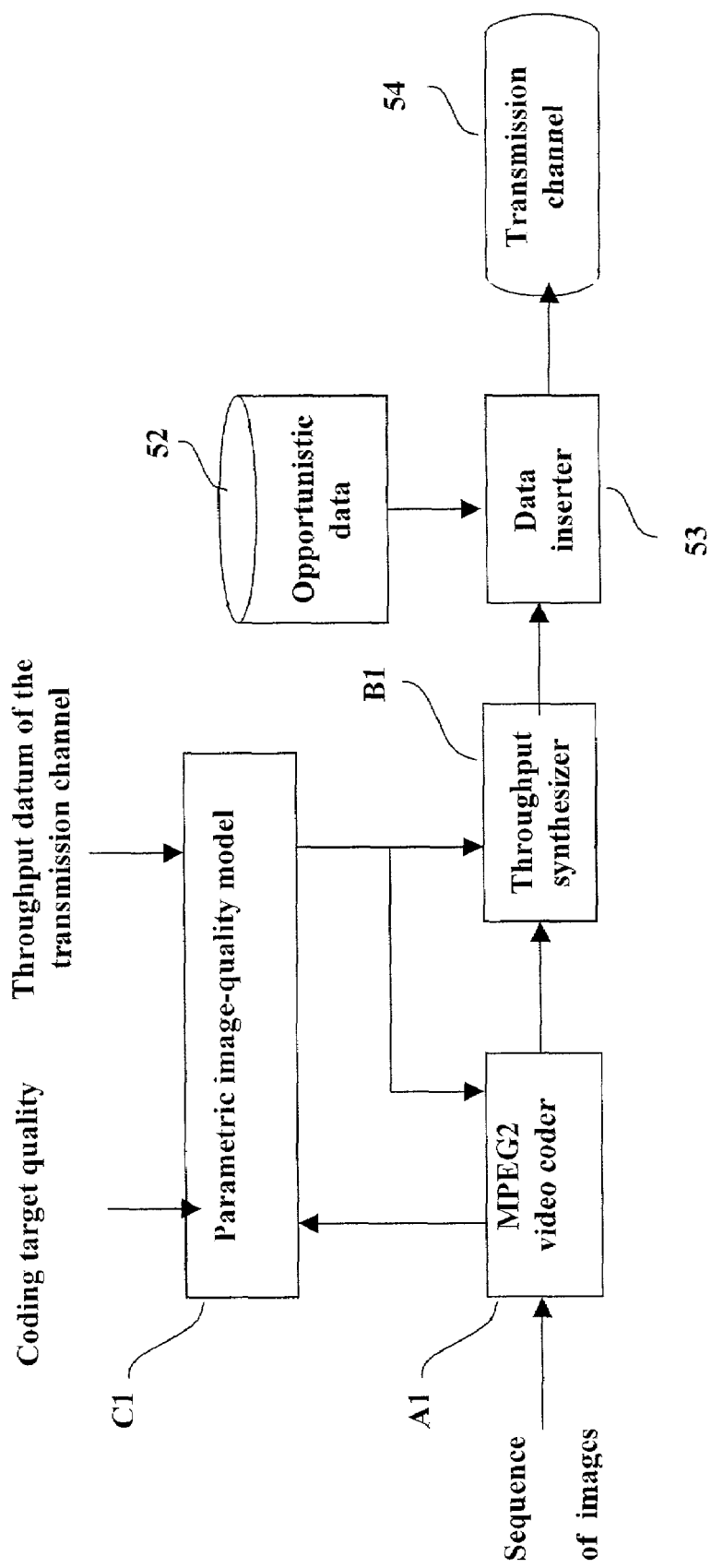
FIG. 3 represents a first example of a block diagram of a system for coding at maximum guaranteed quality according to the invention.

FIG. 3 describes a mode of use of the parametric coding-quality module according to the invention.

The MPEG2 video coder A1 sends the coding statistics, as described by FIG. 2, to a parametric image-quality module C1. The module C1 then applies formulae (8) and (9) in order to arrive at the value $D_{ref}$ of the maximum throughput making it possible to reach the maximum coding-quality level applied as datum value. It then carries out a comparison of this maximum throughput with the throughput value of the transmission channel $D_{channel}$ received as datum value.

In return, the MPEG 2 video coder A1 and the throughput-synthesis module B1 receive, from the module C1, the throughput value $D_{coder}$:

$$D_{coder} = \min(D_{channel}, D_{ref}) \qquad (12)$$

where min (A, B) represents the operator for calculating the minimum between the magnitudes A and B.

Thus, the quality level of the MPEG2 video stream after decoding is found to be bounded at the maximum value programmed as datum value on the parametric quality module C1.

When the throughput $D_{ref}$ is less than the throughput of the transmission channel $D_{channel}$, a data-insertion module 53 can insert opportunistic data into a transmission channel, at the throughput $D_{channel} - D_{ref}$ in such a way as to fill to the maximum the whole of the bandwidth available on a transmission channel 54. The reading of the opportunistic data takes place from a database 52.

As a consequence, the device described by FIG. 3 makes it possible to limit the coding-quality level to a datum value in such a way that, when this quality level is reached, some of the bandwidth of the transmission channel is used for the transport of opportunistic data.

Figure 4:
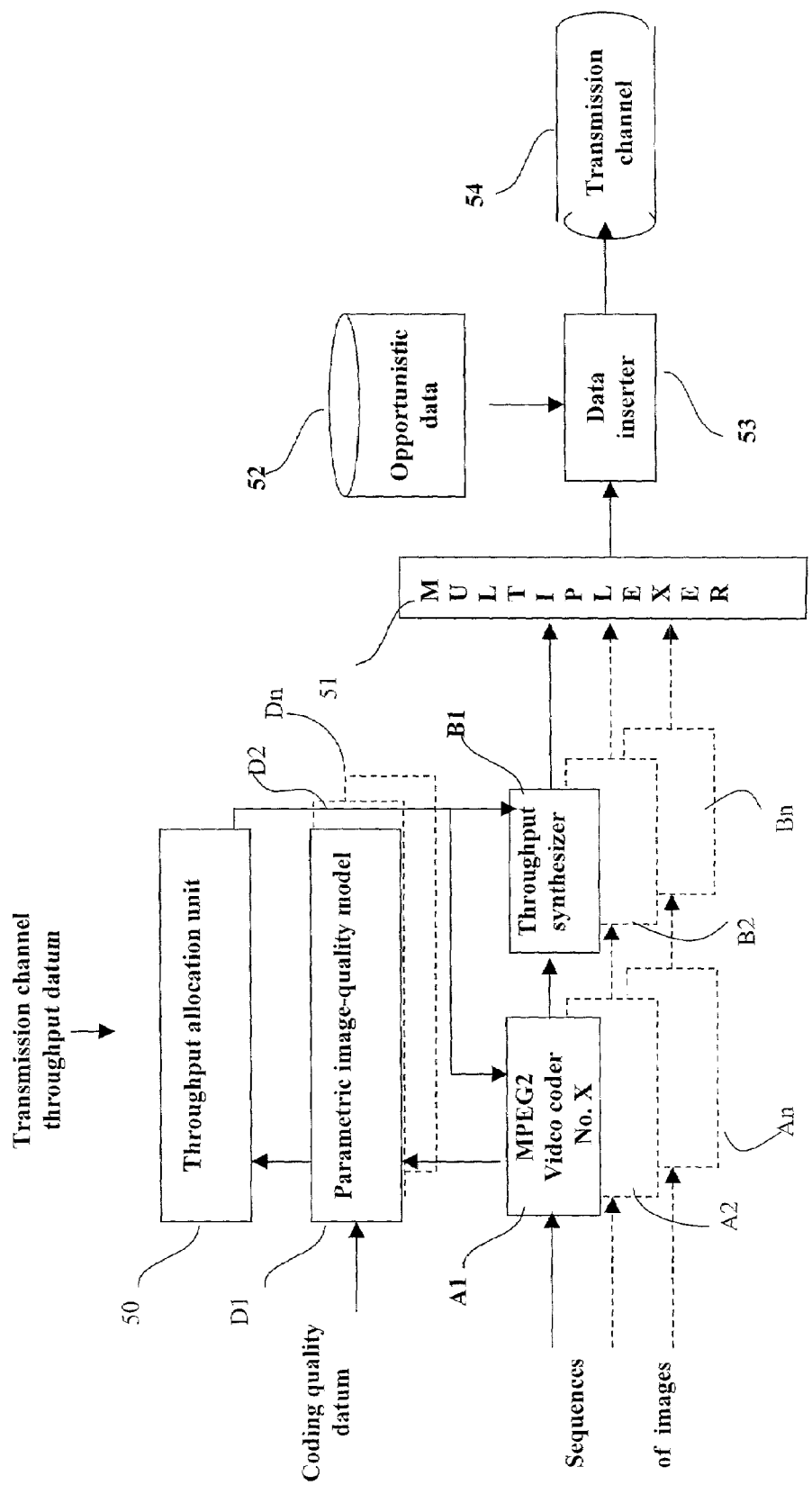
FIG. 4 represents a second block-diagram example of a system for coding at maximum quality according to the invention.

FIG. 4 describes a mode of use of the parametric coding-quality module according to the invention in the case of a multi-programme coding in statistical multiplexing mode. One benefit of the device then lies in the capacity, for each MPEG2 video coder A1, A2, ..., An producing the final multiplex, to follow a maximum quality level not to be exceeded.

When the coding is intended for transmission on a channel with fixed bandwidth, and when this bandwidth is sufficiently wide to allow the transmission of several MPEG2 video streams simultaneously, it becomes possible to reduce the variations in quality of each of the programmes by allocating the throughput of each programme jointly and dynamically.

The multi-programme stream, in this case, contains several video streams of MPEG2 type, time-division multiplexed in packets by a multiplexing module 51. This multiplexing module 51 receives each MPEG2 video stream the throughputs of which change over time. The operating principle is based on an exchange of information between each MPEG2 video coder A1, A2, ..., An and a throughput-allocation unit 50 via a parametric image-quality model D1, D2, ..., Dn.

In particular, each MPEG2 video coder A1, A2, ..., An carries out a measurement of the content of the video-image sequence which it has to code in the form of a magnitude representative of the coding difficulty. By way of example, this magnitude may be derived from a measurement of spatial-temporal complexity expressed in the form of the product of the average quantization interval in the course of use by its throughput-regulation module 404 and the observed coding cost at the input of its buffer memory 114. The throughput request from the coder of index i in the group of coders will therefore be denoted Ri.

The throughput-allocation module 50 continuously gathers these requests Ri from the MPEG2 video coders connected to the multiplexing module 51 via their parametric image-quality modules D1, D2, ..., Dn. It then applies a rule for distribution of the target bitrate for this group of coders in proportion to the requests passed back by each coder in the form:

$$D_i = \frac{R_i}{\sum_{j=1}^{N} R_j} D_{channel} \qquad (1)$$

with:

$D_i$: throughput allocated to the coder i.

$R_i$: throughput request issued by the coder i to the throughput-allocated module 50.

$D_{channel}$: usable throughput on the transmission channel 54.

N: number of coders connected to the multiplexer 51.

In the absence of the parametric quality module, formula (1) is applied for each coder linked to the multiplexing module 51. Thus, the sum of the throughputs forwarded by the module 50 to each of the coders A1, A2, ..., An and throughput synthesizers B1, B2, ..., Bn is constant and equal to the usable throughput of the transmission channel 54.

A detailed example of implementation of the throughput-allocation module is given in the European Patent Application EP1037473 filed in the name of the company Thomson Broadcast Systems.

The statistical-multiplexing solution makes it possible significantly to reduce the time-domain variation in the quality of coding of a sequence of images without in any way satisfying the objective of constant quality due to the fact that the number of coded video sequences is rapidly limited by the bandwidth of the transmission channel 54. The statistic on spatial-temporal complexity of the set of video sequences then exhibits greater or lesser variations as a function of the number of coders connected to the multiplexing module 51.

To do that, the parametric image-quality modules D1, D2, ..., Dn associated respectively with the MPEG2 video coders A1, A2, ..., An send a request on two levels to a throughput-allocation module 50. On the one hand, they forward the throughput request R as it is issued by the coders A1, A2, ..., An. Jointly, they send a value of maximum throughput in the form of the throughput $D_{ref}$ as described by equation (9) and in accordance with the coding-quality-level datum value. The throughput-allocation unit 50 then distributes the throughputs among the MPEG2 video coders A1, A2, ..., An producing the multiplex in accordance with formula (1), nevertheless limiting the throughput of each coder to the maximum value $D_{ref}$ as calculated by its associated parametric image-quality module.

Hence, when the sum of the maximum throughputs $D_{ref}$ output by the MPEG2 coders falls below the value of the target bitrate of the group of coders, a multiplexer (64) is against set to send out "empty" packets in such a way as to fill up the whole of a transmission channel 54. These "empty" packets are then replaced by opportunistic data packets by the module 53 which reads these data from a database 52.

The device of FIG. 4 thus allows transport of opportunistic data (data the throughput of which is not guaranteed over time) on an MPEG2-video-stream transmission channel only when the datum quality level is reached by all the MPEG 2 video coders.

In fact, each MPEG2 video coder A1, A2, . . . , An has a target quality value allocated to it via its parametric image-quality module D1, D2, . . . , Dn. This datum value may vary from one coder to another, which means that some coders are likely to reach their maximum quality end stop (and therefore maximum throughput) before others. The device proposed according to the invention advantageously makes it possible to make the throughput of the channel available to the coders not having reached their maximum coding quality, in priority, before allowing the insertion of blank packets by the multiplexer 51.

The examples of application of the coding-quality monitoring method by parametric modelling presented in this document do not constitute the only possible instances of use. The content of the figures forms an integral part of the description.

The invention claimed is:

1. Method of monitoring the quality of video data having to undergo coding and decoding, making it possible to maintain predetermined constant quality of the video data after decoding, said method comprising the steps of:
   Receiving from at least one coder information representing the complexity of video data to be coded,
   Calculating, as a function of the complexity for each video-data item to be coded and of a programmed target quality value for dynamically adjusting the rate to the content, a reference quantization value,
   Calculating for each video-data item to be coded, a reference throughput as a function of the reference quantization value and transmitting the reference throughput to the coder, allowing the coder to code each video-data item so as to obtain video data at the predetermined quality, after decoding.

2. Method according to claim 1, comprising the step of measuring the complexity of the said video data by carrying out, on the one hand, an analysis of coding costs which are obtained by a discrete-cosine transform, quantization and coding of variable-length type and, on the other hand, an analysis of cost of the syntax necessary for the generation of the coded video data.

3. Method according to claim 2, wherein the video data possibly being in spatial mode, data known as intra-type data or data in time-domain mode, video data known as inter-type data possibly being either bi-directional or predicted, the analysis of the coding costs consists, in the case of the video data of intra and inter type, in carrying out a spatial analysis of the content followed, in the case of the inter-type images, by a time-domain analysis.

4. Method according to claim 1, wherein when the video data are transmitted after coding on a transmission channel the bandwidth of which is fixed, the throughput applied at the output of the said coder is the minimum value between the reference throughput calculated and the throughput of the transmission channel.

5. Method according to claim 4, comprising the step of:
   when the reference throughput is less then the throughput of the transmission channel, inserting data known as opportunistic data into the transmission channel, the throughput of these opportunistic data being at most equal to the throughput of the transmission channel minus the reference throughput.

6. Method according to claim 1, comprising the step of
   when information representing the complexity of video data to be coded is received from at least two coders, the data output by the various coders being intended to be transmitted on the same transmission channel, calculating a target bitrate for each coder, representing a fraction of the throughput of the channel, the sum of the throughputs Di being equal to the throughput of the channel, and
   when the sum of the reference throughputs is greater than the throughput of the channel, sharing the throughput of the channel between the various coders by allocating them their target bitrate, less than their reference throughput,
   when the sum of the reference throughputs is less than or equal to the throughput of the channel, allocating its reference throughput to each coder.

7. Method according to claim 6, comprising the step of:
   when the sum of the reference throughputs is less than the throughput of the transmission channel, inserting data known as opportunistic data into the transmission channel, the throughput of these opportunistic data being at most equal to the throughput of the transmission channel minus the sum of the reference throughputs.

8. Device for monitoring the quality of video data having to undergo coding and decoding making it possible to maintain predetermined constant quality of the data after decoding, characterized in that it includes:
   Means for receiving, from at least one coder, information representing the complexity of data to be coded,
   Means for calculating a reference quantization value, for each data item to be coded and of a programmed target quality value for dynamically adjusting the rate to the content, as a function of the complexity,
   Means for calculating, and transmitting to the coder, for each data item to be coded, a reference throughput as a function of the reference quantization value, allowing the coder to code each data item so as to obtain data at the predetermined quality after decoding.

9. System for coding video data, characterized in that it includes at least one video coder, a device for monitoring the quality of video data according to claim 8, a multiplexer, and a means for inserting data, known as opportunistic data, in order to transmit the coded video data and the opportunistic data on the same transmission channel.

* * * * *